US012777411B2

(12) United States Patent
Gupta et al.

(10) Patent No.: US 12,777,411 B2
(45) Date of Patent: Oct. 27, 2026

(54) TECHNOLOGIES FOR SIGNAL LEVEL ENHANCED NETWORK SELECTION

(71) Applicant: Apple Inc., Cupertino, CA (US)

(72) Inventors: Vivek G. Gupta, San Jose, CA (US); Deepak Dash, Bangalore (IN); Dipannita Dey, Bangalore (IN)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 18/494,661

(22) Filed: Oct. 25, 2023

(65) Prior Publication Data

US 2024/0147355 A1 May 2, 2024

(30) Foreign Application Priority Data

Nov. 2, 2022 (IN) ............................ 202241062680

(51) Int. Cl.
*H04W 48/18* (2009.01)
*H04W 24/02* (2009.01)
*H04W 84/04* (2009.01)

(52) U.S. Cl.
CPC ........... *H04W 48/18* (2013.01); *H04W 24/02* (2013.01); *H04W 84/042* (2013.01)

(58) Field of Classification Search
CPC .................................................... H04W 48/18
USPC ...................................................... 455/422.1
See application file for complete search history.

(56) References Cited

U.S. PATENT DOCUMENTS

| | | | | |
|---|---|---|---|---|
| 11,805,472 | B2 * | 10/2023 | Adjakple | H04W 48/08 |
| 2012/0100848 | A1 * | 4/2012 | Miklos | H04W 16/08 455/432.1 |
| 2016/0345151 | A1 * | 11/2016 | Chen | H04M 15/7556 |
| 2019/0239147 | A1 * | 8/2019 | Chun | H04W 88/06 |
| 2020/0068456 | A1 * | 2/2020 | Humbert | H04L 41/0668 |
| 2020/0245235 | A1 * | 7/2020 | Chun | H04W 48/18 |
| 2022/0256445 | A1 * | 8/2022 | Sedin | H04B 7/18539 |
| 2022/0338154 | A1 * | 10/2022 | Niemi | H04L 65/1016 |
| 2023/0354176 | A1 * | 11/2023 | Lai | H04W 48/18 |
| 2024/0031927 | A1 * | 1/2024 | Lin | H04W 48/18 |

OTHER PUBLICATIONS

[AT119bis-e][014][NR18] Sense, 3GPP TSG-RAN WG2 Meeting #119bis-e , R2-2210985, Oct. 10-19, 2022, 10 pages.
Discussion on Applicability of SENSE for (non-) Stationary IoT Devices, 3GPP TSG-CT WG1 Meeting #138-e , C1-225578, Oct. 10-14, 2022, 2 pages.
Discussion on RAN Aspects of Signal Level Enhanced Network Selection, 3rd Generation Partnership Project, R2-2210529, Oct. 10-19, 2022, 4 pages.
Discussion on Signal Level Enhanced Network Selection, 3GPP TSG-CT WG1 Meeting #138-e , C1-225928, Oct. 10-14, 2022, 3 pages.
NAS configuration MO for using Sense, 3GPP TSG-CT WG1 Meeting #138-e, C1-225581, Oct. 10-14, 2022, 24 pages.
European Patent Application No. 23206685.2, Extended European Search Report, Mar. 26, 2024, 16 pages.

(Continued)

*Primary Examiner* — Qutbuddin Ghulamali
(74) *Attorney, Agent, or Firm* — Kilpatrick Townsend & Stockton LLP

(57) ABSTRACT

The present application relates to devices and components including apparatuses, systems, and methods for signal level enhanced network selection.

19 Claims, 8 Drawing Sheets

(56) References Cited

OTHER PUBLICATIONS

Updates to PLMN Selection for SENSE, Apple, Huawei, HiSilicon, 3GPP TSG-CT WG1 Meeting #138-e, C1-226120, Oct. 10-14, 2022, 8 pages.

New WID on 5G Timing Resiliency System (SENSE), SA WG1 (from S1-211369), TSG SA Meeting #SP-92E, SP-210525, Jun. 15-21, 2021, 3 pages.

Signal level Enhanced Network Selection, 3GPP TSG-SA1 Meeting #95e, S1-213329, Aug. 23-Sep. 2, 2021, 9 pages.

New WID on CT Aspects of Signal Level Enhanced Network Selection, 3GPP TSG-CT Meeting #97-e, CP-222186, Sep. 12-14, 2022, 4 pages.

3rd Generation Partnership Project; Technical Specification Group Core Network and Terminals; AT command set for User Equipment (UE) (Release 18), 3GPP TS 27.007 V18.0.0, Sep. 2022, 443 pages.

3rd Generation Partnership Project; Technical Specification Group Core Network and Terminals; Non-Access Stratum (NAS) configuration Management Object (MO) (Release 17), 3GPP TS 24.368 V17.3.0, Jun. 2022, 48 pages.

3rd Generation Partnership Project; Technical Specification Group Core Network and Terminals; Non-Access Stratum (NAS) functions related to Mobile Station (MS) in idle mode (Release 18), 3GPP TS 23.122 V18.0.0, Sep. 2022, 136 pages.

3rd Generation Partnership Project; Technical Specification Group Core Network and Terminals; Non-Access-Stratum (NAS) protocol for 5G System (5GS); Stage 3; (Release 18), 3GPP TS 24.501 V18.0.1, Sep. 2022, 1007 pages.

India Patent Application No. 202241062680, First Examination Report, May 20, 2026, 7 pages.

* cited by examiner

TECHNOLOGIES FOR SIGNAL LEVEL ENHANCED NETWORK SELECTION

CROSS-REFERENCE TO RELATED APPLICATION

This application claims the benefit of India Patent Application No. 202241062680, filed on Nov. 2, 2022, which is herein incorporated by reference in its entirety for all purposes.

TECHNICAL FIELD

This application relates generally to communication networks and, in particular, to technologies for signal level enhanced network selection.

BACKGROUND

Use cases for stationary Internet of things (IoT) devices are growing exponentially. Sometimes these devices are deployed outdoors in remote locations and cannot be easily reached. This may result in challenging local coverage conditions, which may be persistent given their stationary deployment. The IoT devices may also be in a permanent roaming situation, either because the IoT devices were deployed in a country other than that of the provided universal subscriber identity module (USIM) or because of the use of a global USIM for IoT use cases.

A stationary IoT device experiencing unstable conditions may experience a number of challenges. During network selection procedure (for example, public land mobile network (PLMN) selection), a stationary IoT device may select, and stay on, a VPLMN on which they can barely attach. And, due to changing radio conditions such as fading, absorption etc., the device may experience a significant failure rate when setting up a data radio bearer. It may not be possible for the operator of the PLMN to detect such problems. Once such cases occur, on-site manual intervention may be needed to identify and fix the problem. This may impact operational expenditures (OPEX) and deployments.

DETAILED DESCRIPTION

Figure 1:
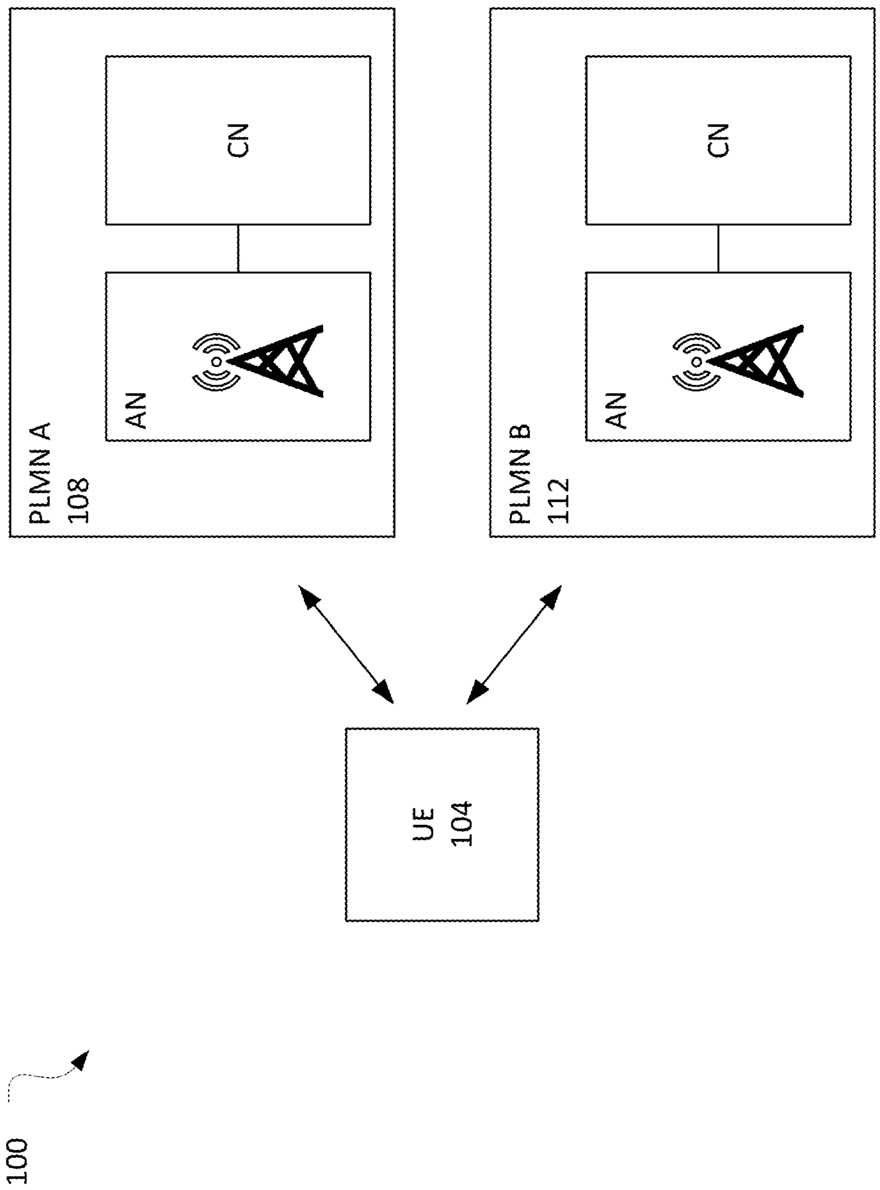
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, and/or techniques in order to provide a thorough understanding of the various aspects of some embodiments. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B); and the phrase "based on A" means "based at least in part on A," for example, it could be "based solely on A" or it could be "based in part on A."

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), and/or digital signal processors (DSPs), that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations; or recording, storing, or transferring digital data. The term "processor circuitry" may refer an application processor; baseband processor; a central processing unit (CPU); a graphics processing unit; a single-core processor; a dual-core processor; a triple-core processor; a quad-core processor; or any other device capable of executing or otherwise operating computer-executable instructions, such as program code; software modules; or functional processes.

The term "interface circuitry" as used herein refers to, is part of, or includes circuitry that enables the exchange of information between two or more components or devices. The term "interface circuitry" may refer to one or more hardware interfaces; for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to computer, storage, or network resources provided by physical hardware element(s). A "virtualized resource" may refer to computer, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

FIG. 1 illustrates a network environment 100 in accordance with some embodiments. The network environment 100 may include a UE 104, public land mobile network (PLMN) A 108 and a PLMN B 112. The PLMN A 108 may be provided by a first operator (for example, operator A) and may include an access network (AN) coupled with a core network (CN). Similarly, the PLMN B 112 may be provided by a second operator (for example, operator B) and may include an AN coupled with a CN. In various embodiments, the PLMNs may include more than one AN and more than one CN.

The ANs/CNs of the PLMNs may compatible with Third Generation Partnership Project (3GPP) technologies of various generations including, for example, fourth generation (4G), fifth generation (5G), and sixth generation (6G).

The UE 104 may perform a network selection procedure to select one of the available PLMNs. This procedure may be performed when the UE 104 powers on, recovers from a loss of coverage, or performs a periodic re-evaluation.

In existing technologies, a UE may select and attempt to register on a PLMN according to a prioritized order of selection defined within automatic network selection procedures of 3GPP Technical Specification (TS) 23.122 v18.0.0 (2022 September). The PLMNs of the highest priority include a home PLMN (HPLMN) or an equivalent home HPLMN (EHPLMN). The PLMNs of the second highest priority are those listed in a "user-controlled PLMN selector with access technology" data file in a subscriber identity module (SIM) in priority order. The PLMNs of the third highest priority are those listed in an "operator-controlled PLMN selector with access technology" data file in the SIM or stored in the memory of the UE in priority order. The PLMNs of the fourth highest priority are other PLMNs with a received high-quality signal in random order. The PLMNs of the fifth highest priority are other PLMNs in order of decreasing signal quality. Additional priority levels are provided for forbidden PLMNs that operate with respect to disaster conditions. In the event that a PLMN of the first three priority levels is present, the signal level of available cells is not taking into account and selection is based solely on the cell-selection criteria broadcast by a PLMN and a priority of networks.

In some instances, a UE may select or stay on a prioritized PLMN with poor coverage at a particular location, even though other lower-priority PLMNs may be available with much better local coverage. For a typical consumer UE, this may not be a problem as the conditions may change due to inadvertent or intentional mobility of the UE or by using a manual PLMN selection. This behavior may be desired as part of steering of roaming and may avoid a frequent changing of networks. However, for stationary devices without supervision by a user (e.g., IoT devices), selection of a prioritized PLMN with poor coverage at a particular location may present more of a challenge.

Thus, in some embodiments, the signal level of available cells may be taken into account during the initial steps of network selection after switch-on, recovery from loss of coverage, and during all steps of a periodic re-evaluation. For example, the UE 104 may consider the signal level of PLMNs of the first, second, third, or fifth priority levels when performing network selection. The UE 104 may consider the signal level by comparing the signal level to a threshold that may be configured by an operator for a particular access technology. The home operator may configure/update/delete operator-controlled signal threshold(s) per access technology on a universal SIM (USIM) or nonvolatile memory (NVM) of the device. Consideration of the signal level during the initial steps of the network selection may be referred to herein as signal level enhanced network selection (SENSE).

In some embodiments, SENSE operation may be configured for certain types of UEs. For example, in some embodiments, the SENSE operations may be configured for stationary IoT UEs that support narrowband (NB)-IoT, Global System for Mobile Communication (GSM) Enhanced Data Rates for GSM Evolution Radio Access Networks (GERAN) extended coverage (EC)-GSM-IoT, or Category M1 or M2 of Evolved Universal Terrestrial Access (E-UTRA). The automatic network selection procedures may be enhanced in case an operator-controlled signal threshold per access technology (OCSTPAT) is configured on a USIM within a UE. The allowed range of the OCSTPAT may be between the cell selection criterion and a high-quality signal as defined in TS 23.122.

3GPP TS 27.007 v18.0.0 (2022 Sep. 23) defines attention (AT) command sets for UEs. The AT commands may be a mechanism for a terminal equipment (TE) to control functions and network services provided by a mobile termination (MT). AT commands are standard interfaces that may be used for testing, interoperability, and compliance.

3GPP TS 27.007 defines AT commands that are transmitted from the TE to the MT and responses transmitted from the MT to the TE. In some embodiments, a terminal adapter (TA) may reside between the TE and the MT to provide a conversion function. For example, in a first direction, the TA may receive an AT command from the TE and may provide an MT control message to the MT. In a second direction, the TA may receive an MT status message from the MT and may provide a response to the TE. In some embodiments, the TA may not be present or may be considered to be incorporated within the TE or the MT. As used herein, AT commands provided from the TE to the MT may include any derivative messages, for example, an MT control message. Conversely, responses provided from the MT to the TE may include any message from which it is derived, for example, an MT status message.

Various considerations may be relevant to devices implementing SENSE procedures. These considerations include: how an operator may update signal thresholds, how a UE may control applicability of SENSE, how a TE communicates with an MT and indicates operator-configured thresholds to the MT, how the TE sends OCSTPAT from upper layers to the network (e.g., through MT), how AT commands are affected by the configured thresholds, how PLMN selection is impacted by the configured thresholds, and how the configured thresholds are reported to the upper layers.

Embodiments of the present disclosure describe how thresholds may be stored in a USIM or NVM and updated using steering of roaming (SoR) mechanisms. Further embodiments describe the use of non-access stratum (NAS) configuration management object (MO) to control applicability of SENSE operations. In some embodiments, existing AT commands may be updated to include SENSE values. In other embodiments, a new AT command may be defined to convey SENSE values.

Figure 2:
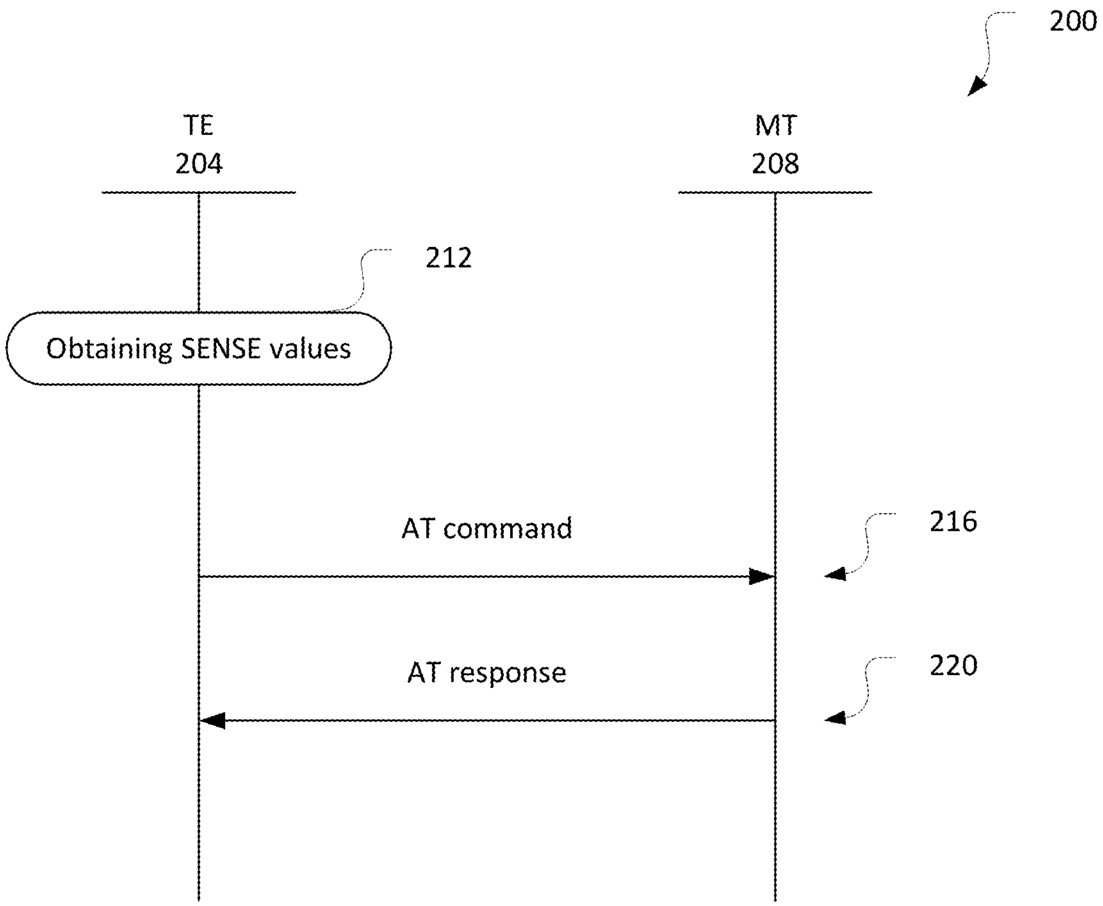
FIG. 2 illustrates a signaling diagram in accordance with some embodiments.

FIG. 2 is a signaling diagram 200 in accordance with some embodiments. The signaling diagram 200 includes signals between a TE 204 and an MT 208. The TE 204 and the MT 208 may be disposed in the UE 104. In some embodiments, the TE 204 may correspond to application circuitry of the UE 104 (for example, central processor unit circuitry 704B of FIG. 7) while the MT 208 may correspond to a modem/communication circuitry (for example, baseband processor circuitry 704A of FIG. 7) of the UE 104. In general, the TE 204 may implement relatively higher protocol layers while the MT 208 implements relatively lower protocol layers.

At 212, the signaling diagram 200 may include obtaining SENSE values. The SENSE values may include a value that indicates whether the UE 104 is to apply SENSE. This value may be referred to as an apply-threshold value. The SENSE values may additionally/alternatively include one or more thresholds that are to be used with SENSE operations.

At 216, the signaling diagram 200 may include the TE 204 transmitting an AT command to the MT 208. The AT command may include one or more of the SENSE values obtained at 212. In some embodiments, the SENSE values conveyed by the AT command may include the apply-threshold value and one or more threshold values. In other embodiments, the AT command may only include the one or more threshold values. In these embodiments, the TE 204 may transmit the AT command with the threshold values only in the event the TE 204 determines, based on the apply-threshold value, that SENSE is to be applied.

At 220, the signaling diagram 200 may include the MT 208 transmitting a response to the TE 204. The content of the response may be based on a status of the MT 208 and the type of AT command received at 216. Example AT commands and associated responses are described in further detail elsewhere herein.

In some embodiments, the thresholds may be operator-controlled signal thresholds that may be updated by an operator and may be stored in an NVM of the UE 104 or a USIM. In general, the threshold values in the USIM may take precedence over the threshold values in the NVM. The thresholds may be updated by an operator using a SoR mechanism. For example, the operator may update the thresholds in the NVM and copy them over to the USIM (to prevent existing thresholds in the USIM from taking precedence over the thresholds in the NVM). Alternatively, the operator may update the thresholds in the NVM and delete the thresholds in the USIM.

In some embodiments, the thresholds may only be used if a subscription permanent identifier (SUPI) or any other unique identifier in a USIM matches the SUPI stored in the NVM.

The apply-threshold value may be used to configure the UE 104 as to whether to apply SENSE. Application of SENSE may be configured independently from the operator-configured thresholds. For example, in some embodiments, the UE 104 may be configured with, or otherwise have access to, SENSE thresholds but may still be configured to not apply SENSE. This may be useful if, for example, the UE 104 is a mobile, multi-purpose device that installs a USIM having the SENSE thresholds. In some embodiments, the apply-threshold value may be provided as a local configuration by a manufacturer or through a NAS configuration management object (MO) provisioned by an operator. The manufacturer or operator may make the determination of whether SENSE is to be applied based on, for example, a UE subscription, a type of UE (for example, IoT device, reduced capability (RedCap) device, general-purpose smartphone, etc.), a mobility pattern (for example, stationary or mobile).

Figure 3:
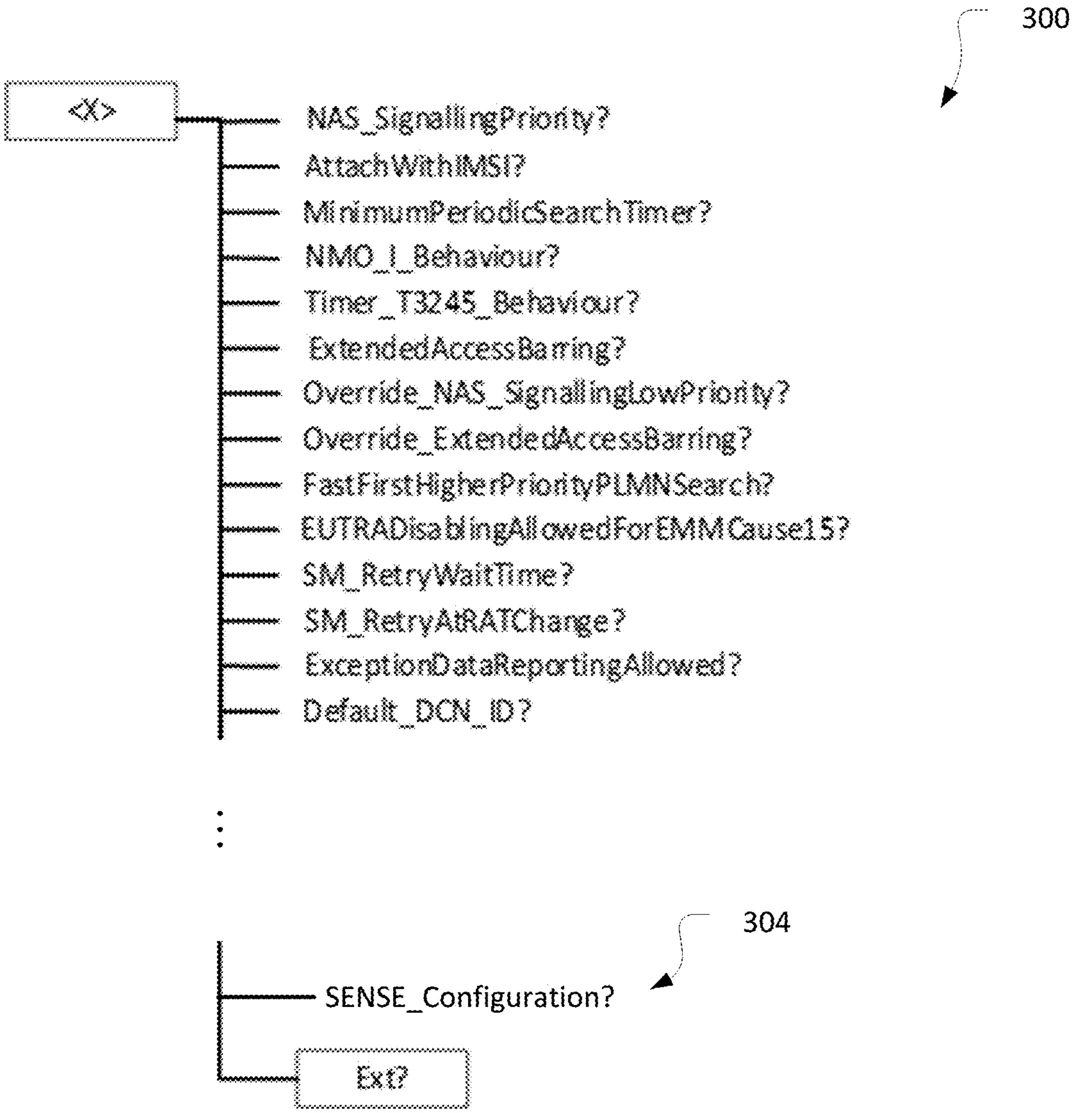
FIG. 3 illustrates non-access stratum configuration management object in accordance with some embodiments.

FIG. 3 illustrates a NAS configuration MO 300 in accordance with some embodiments. Except as otherwise described, the NAS configuration MO 300 may be similar to a NAS configuration MO defined in 3GPP TS 24.368 v17.3.0 (2022 June).

The NAS configuration MO 300 may include a new leaf referred to as a SENSE_configuration 304. The SENSE configuration 304 may indicate whether or not a UE is configured to apply SENSE. As mentioned above, the configuration of whether to apply SENSE may be irrespective of whether operator controlled thresholds are available on the USIM/NVM.

The SENSE_configuration 304 may have an occurrence of zero or one, a boolean format, and a get or replace access type. The SENSE_configuration may be set with a value of 0 to indicate that the UE is not configured to apply SENSE or a value of '1' to indicate that the UE is configured to apply SENSE. These settings and values may be adjusted in different embodiments.

The AT command transmitted at 216 of the signaling diagram 200 may be an existing AT command updated to include SENSE values or a new AT command.

In some embodiments, the AT command transmitted at 216 or AT response transmitted at 220 may be a PLMN selection (+COPS) AT command. Table 1 below illustrates a +COPS AT command in accordance with some embodiments.

TABLE 1

| Command | Possible Response(s) |
|---|---|
| +COPS=[<mode>[<,format>[,<oper>[,<ACT>[,<threshRSRP>[,<threshRSRQ>]]]]]] | +CME ERROR: <err> |
| +COPS? | +COPS: <mode> [,<format>,<oper>[,<AcT>,<threshRSRP>,<threshRSRQ>]]<br>+CME ERROR: <err> |
| +COPS=? | +COPS: [list of supported (<stat>,long alphanumeric <oper>,short alphanumeric <oper>,numeric <oper>[,<AcT>])s][,,(list of supported <mode>s),(list of supported <format>s),(list of supported <threshRSRP>s),(list of supported <threshRSRQ>s)]<br>+CME ERROR: <err> |

Except as otherwise described herein, the +COPS AT command may be similar to the like-named AT command in clause 7.3 of 3GPP TS 27.007.

The set command, which corresponds to the command of the first row of Table 1, forces an attempt to select and register to a network operator using the SIM/USIM card installed in the currently selected card slot. The network operator may be a GSM, Universal Mobile Telecommunication System (UMTS), evolved packet system (EPS), or 5G system (5GS) operator.

The set command may include a number of optional parameters such as mode (<mode>), format (<format>), operator (<oper>), and access technology (<AcT>) that are similar to like-named parameters of clause 7.3 of 3GPP TS 27.007. The set command may also include optional SENSE parameters such as RSRP threshold (<threshRSRP>) or RSRQ threshold (<threshRSRQ>). The RSRP threshold may be an integer-type value that indicates an operator-controlled signal threshold for RSRP for PLMN selection. The RSRQ threshold may be an integer-type value that indicates an operator-controlled signal threshold for RSRQ for PLMN selection.

The operator-controlled signal thresholds may be configured per access technology. In some embodiments, if the thresholds are available on the USIM, the UE 104 shall select a network only if the network selection conditions (from TS 23.122, for example) are met and the received signal power of the candidate PLMN/access technology combination is equal to or higher than the operator-controlled signal threshold for RSRP for that technology, or the received signal quality of the candidate PLMN/access technology combination is equal to or higher than the operator-controlled signal threshold for RSRQ for that technology. If no candidate PLMN/access technology combination fulfills the operator-controlled signal threshold criteria, the UE 104 shall repeat the automatic network selection procedure without applying the operator controlled signal threshold per access technology in accordance with some embodiments.

A response to the set command may include an error response in the event the set command was not successfully implemented at the MT 208.

The read command, which corresponds to the command of the second row of Table 1, may be used to request that the MT 208 return current parameters. For example, in response to a read command, the MT 208 may transmit a response that includes the currently selected operator, the current access technology, the current operator-controlled signal threshold for RSRP, and the current operator-controlled signal threshold for RSRQ. If no operator is selected, <format>, <oper>, <AcT>, <threshRSRP> and <threshRSRQ> may be omitted.

The test command, which corresponds to the command of the third row of Table 1, may be used to request that the MT 208 return parameter sets corresponding to various operators present in the network. A parameter set may include an integer indicating the availability of the operator <stat>, long and short alphanumeric format of the name of the operator, numeric format representation of the operator, and access technology. For each operator/access technology, the response may additionally include a list of supported <modes>, <formats>, <threshRSRP>s, or <threshRSRQ>s.

In some embodiments, the AT command transmitted at 216 or AT response transmitted at 220 may be a preferred PLMN list (+CPOL) AT command. Table 2 below illustrates a +CPOL AT command in accordance with some embodiments.

TABLE 2

| Command | Possible Response(s) |
|---|---|
| +CPOL=[<index>][,<format>[,<oper>[,<GSM_AcT>,<GSM_Compact_AcT>,<UTRAN_AcT>,<E-UTRAN_AcT>,<NGRAN_AcT>[,<threshRSRP>[,<threshRSRQ>]]]]] | +CME ERROR: <err> |
| +CPOL? | +CPOL: <index1>,<format>,<oper1>[,<GSM_AcT1>,<GSM_Compact_AcT1>,<UTRAN_AcT1>,<EUTRAN_AcT1>, <NG-RAN_AcT1>,<threshRSRP>[,<threshRSRQ>][<CR><LF>+CPOL: <index2>, <format>, <oper2>[,<GSM_AcT2>,<GSM_Compact_AcT2>,<UTRAN_AcT2>,<EUTRAN_AcT2,<NG-RAN_AcT2>,<threshRSRP>[,<threshRSRQ>][...]] |

TABLE 2-continued

| Command | Possible Response(s) |
| --- | --- |
| +CPOL=? | +CPOL: [list of supported (<stat>,long alphanumeric <oper>,short alphanumeric <oper>,numeric <oper>[,<AcT>])s][,,(list of supported <mode>s),(list of supported <format>s),(list of supported <threshRSRP>s),(list of supported <threshRSRQ>s)]<br>+CME ERROR: <err> |

Except as otherwise described herein, the +CPOL AT command may be similar to the like-named AT command in clause 7.19 of 3GPP TS 27.007. The +CPOL AT command may be used to edit a PLMN selector with access technology lists in the SIM card or active application in the universal integrated circuit card (UICC) (GSM or USIM).

The execute command, which corresponds to the command of the first row of Table 2, may include a number of optional parameters such as index (<index>), format (<format>), operator (<oper>), and access technology selection parameters (e.g., <GSM_AcT>, <GSM_Compact_AcT>, <UTRAN_AcT>, <E-UTRAN_AcT>, <NG-RAN_AcT>) that are similar to like-named parameters of clause 7.19 of 3GPP TS 27.007. The execute command may also include optional SENSE parameters such as RSRP threshold (<threshRSRP>) or RSRQ threshold (<threshRSRQ>). The RSRP threshold may be an integer-type value that indicates an operator-controlled signal threshold for RSRP for PLMN selection. The RSRQ threshold may be an integer-type value that indicates an operator-controlled signal threshold for RSRQ for PLMN selection.

The operator-controlled signal thresholds may be configured per access technology. In some embodiments, if the thresholds are available on the USIM, the UE 104 shall select a network only if the network selection conditions (from TS 23.122, for example) are met and the received signal power of the candidate PLMN/access technology combination is equal to or higher than the operator controlled signal threshold for RSRP for that technology, or the received signal quality of the candidate PLMN/access technology combination is equal to or higher than the operator controlled signal threshold for RSRQ for that technology. If no candidate PLMN/access technology combination fulfills the operator-controlled signal threshold criteria, the UE 104 shall repeat the automatic network selection procedure without applying the operator controlled signal threshold per access technology in accordance with some embodiments.

A response to the execute command may include an error response in the event the execute command was not successfully implemented at the MT 208.

The read command, which corresponds to the command of the second row of Table 2, may be used to request that the MT 208 return all used entries from the SIM/USIM list of preferred PLMNs with the access technologies for each PLMN in the list. For example, in response to a read command, the MT 208 may transmit a response that includes a list of entries for each PLMN in the list (shown in Table 2 as index 1 corresponding to PLMN 1 and index 2 corresponding to PLMN 2). In addition to the entries described in clause 7.19 of TS 27.007, the response may further include, in each list, an operator-controlled signal threshold for RSRP, or an operator-controlled signal threshold for RSRQ.

The test command, which corresponds to the command of the third row of Table 2, may be used to request that the MT 208 return the whole index range supported by the SIM as compound values. In addition to the entries described in clause 7.19 of TS 27.007, the returned compound values may include a list of supported <threshRSRP>s or a list of supported <threshRSRQ>s.

In some embodiments, the AT command transmitted at 216 or AT response transmitted at 220 may be a selection of preferred PLMN list (+CPLS) AT command. Table 3 below illustrates a +CPLS AT command in accordance with some embodiments.

TABLE 2

| Command | Possible Response(s) |
| --- | --- |
| +CPLS=[<list>[,<threshRSRP>[,<threshRSRQ>]]] | +CME ERROR: <err> |
| +CPLS? | +CPLS: <list>[,<threshRSRP>[,<threshRSRQ>]<br>+CME ERROR: <err> |
| +CPLS=? | +CPLS: (list of supported <list>s) ,(list of supported <threshRSRP>s),(list of supported <threshRSRQ>s)<br>+CME ERROR: <err> |

Except as otherwise described herein, the +CPLS AT command may be similar to the like-named AT command in clause 7.20 of 3GPP TS 27.007. The +CPLS AT command may be used to select one PLMN selector with access technology list in the SIM card or active application in the UICC (GSM or USIM) that is used by the +CPOL command.

The execute command, which corresponds to the command of the first row of Table 3, may select a list in the SIM/USIM. In addition to the selected list, the execute command may also include optional SENSE parameters such as RSRP threshold (<threshRSRP>) or RSRQ threshold (<threshRSRQ>). The RSRP threshold may be an integer-type value that indicates an operator-controlled signal threshold for RSRP for PLMN selection. The RSRQ threshold may be an integer-type value that indicates an operator-controlled signal threshold for RSRQ for PLMN selection.

The operator-controlled signal thresholds may be configured per access technology. In some embodiments, if the thresholds are available on the USIM, the UE 104 shall select a network only if the network selection conditions (from TS 23.122, for example) are met and the received signal power of the candidate PLMN/access technology combination is equal to or higher than the operator controlled signal threshold for RSRP for that technology, or the received signal quality of the candidate PLMN/access technology combination is equal to or higher than the operator controlled signal threshold for RSRQ for that technology. If no candidate PLMN/access technology combination fulfills the operator-controlled signal threshold criteria, the UE 104 shall repeat the automatic network selection procedure without applying the operator controlled signal threshold per access technology in accordance with some embodiments.

A response to the execute command may include an error response in the event the execute command was not successfully implemented at the MT 208.

The read command, which corresponds to the command of the second row of Table 3, may be used to request that the MT 208 return the selected PLMN selector list from the SIM/USIM. In addition to providing the selected list as described in clause 7.20 of TS 27.007, the response may further include an operator-controlled signal threshold for RSRP or an operator-controlled signal threshold for RSRQ corresponding to the selected list.

The test command, which corresponds to the command of the third row of Table 3, may be used to request that the MT 208 return the whole index range supported lists by the SIM/USIM as a compound value. In addition to providing the list of supported lists as described in clause 7.20 of TS 27.007, the response may include a list of supported <threshRSRP>s or a list of supported <threshRSRQ>s.

While not explicitly shown with respect to the +COPS, +CPOL, or +CPLS AT command, in some embodiments, these AT commands may additionally/alternatively include other SENSE values, for example, an apply-threshold value.

In some embodiments, the AT command transmitted at 216 or AT response transmitted at 220 may be a PLMN selection with operator thresholds (+COPTHRESH) AT command. Table 4 below illustrates a +COPTHRESH AT command in accordance with some embodiments.

TABLE 4

| Command | Possible Response(s) |
|---|---|
| +COPTHRESH=[,<oper>[,<AcT>[,<threshRSRP>[,<threshRSRQ>[,<applyThresh>]]]]] | +CME ERROR: <err> |
| +COPTHRESH? | +COPTHRESH: <oper>[,<AcT>,<threshRSRP>,<threshRSRQ>,<applyThresh>]]<br>+CME ERROR: <err> |
| +COPTHRESH=? | +COPTHRESH: [list of supported (<oper>[,<AcT>])s][,,,(list of supported <threshRSRP>s),(list of supported <threshRSRQ>s),(list of supported <apply Thresh>s)]<br>+CME ERROR: <err> |

The +COPTHRESH AT command may be used to configure SENSE values to be used with respect to particular operators/access technologies.

The set command, which corresponds to the command of the first row of Table 4, may force an attempt to select and register to the NB-IoT, GERAN EC-GSM-IoT and Category M1 or M2 of E-UTRAN network operator using the currently installed SIM/USIM card and associated SENSE values. In addition to optionally passing the <oper> and <AcT>, the set command may also include optional SENSE parameters such as RSRP threshold (<threshRSRP>), RSRQ threshold (<threshRSRQ>), or apply-threshold value (<applyThresh>).

The RSRP threshold parameter may be an integer-type value that indicates an operator-controlled signal threshold for RSRP for PLMN selection.

The RSRQ threshold parameter may be an integer-type value that indicates an operator-controlled signal threshold for RSRQ for PLMN selection.

The operator parameter may be a string type value that indicates the network operator.

The access technology parameter may be an integer type value that indicates the selected access technology. For example, a value of 7 may correspond to an E-UTRAN, a value of 8 may correspond to an EC-GEC-GSM-IoT (A/Gb mode) (see NOTE 3), a value of 9 may correspond to an E-UTRAN (NB-S1 mode) (see NOTE 4), a value of 10 may correspond to an E-UTRA connected to a 5GCN (see NOTE 5), a value of 11 may correspond to an NR connected to a 5GCN (see NOTE 5), a value of 12 may correspond to an NG-RAN, and a value of 13 may correspond to E-UTRA-NR dual connectivity (see NOTE 6).

NOTE 3: 3GPP TS 44.018 v17.0.0 (2022 Apr. 7) specifies the EC-SCH INFORMATION message which, if present, indicates that the serving cell supports EC-GSM-IoT.

NOTE 4: 3GPP TS 36.331 v17.2.0 (2022 Oct. 4) specifies the System Information blocks which give the information about whether the serving cell supports NB-IoT, which corresponds to E-UTRAN (NB-S1 mode).

The apply-threshold parameter may be a Boolean value that indicates whether operator thresholds are to be applied during PLMN selection for this device.

The operator-controlled signal thresholds may be configured per access technology. In some embodiments, if the thresholds are available on the USIM, the UE 104 shall select a network only if the network selection conditions (from TS 23.122, for example) are met and the received signal power of the candidate PLMN/access technology combination is equal to or higher than the operator controlled signal threshold for RSRP for that technology, or the received signal quality of the candidate PLMN/access technology combination is equal to or higher than the operator controlled signal threshold for RSRQ for that technology. If no candidate PLMN/access technology combination fulfills the operator-controlled signal threshold criteria, the UE 104 shall repeat the automatic network selection procedure without applying the operator controlled signal threshold per access technology in accordance with some embodiments.

A response to the set command may include an error response in the event the set command was not successfully implemented at the MT 208.

The read command, which corresponds to the command of the second row of Table 4, may be used to request that the MT 208 return the currently selected operator, the current access technology, the current operator-controlled signal threshold for RSRP, or the current operator-controlled signal threshold for RSRQ.

The test command, which corresponds to the command of the third row of Table 4, may be used to request that the MT 208 return configured parameters. The configured parameters that may be provided in a response include a list of supported operators/access technologies, a list of supported RSRP/RSRQ thresholds, or a list of supported apply-threshold values.

Aspects of the disclosed embodiments allow devices (for example, stationary IoT devices) to operate efficiently in unstable coverage environments. Further, the enhancements to the AT command/response design allow effective communication of SENSE values between the TE 204 and the MT 208.

Figure 4:
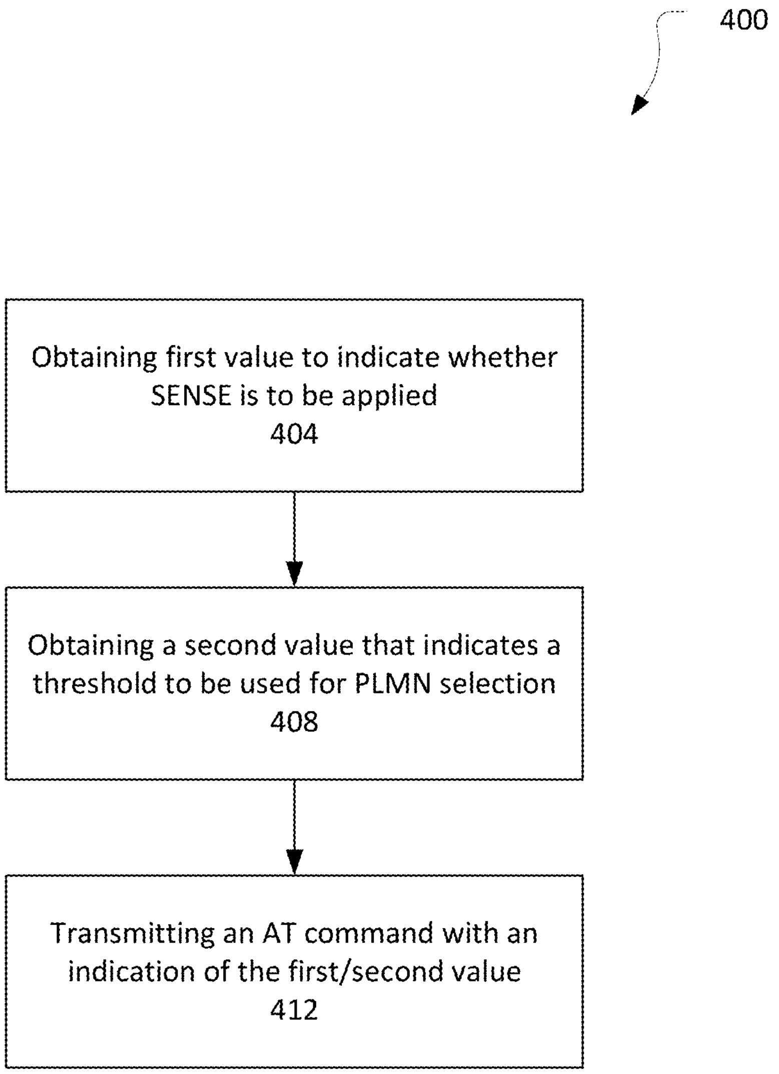
FIG. 4 illustrates an operational flow/algorithmic structure in accordance with some embodiments.

FIG. 4 illustrates an operation flow/algorithmic structure 400 in accordance with some embodiments. The operation flow/algorithmic structure 400 may be implemented by a TE (for example, TE 204) of a UE such as, for example, UE 104 or 700 or components therein, for example, processors 704.

The operation flow/algorithmic structure 400 may include, at 404, obtaining a first value to indicate whether SENSE is to be applied. The first value may correspond to an apply-threshold value described elsewhere herein. In some embodiments, the first value may be obtained from a NAS configuration MO stored in memory of the UE. The first value may be a Boolean value that indicates either the UE is configured to apply SENSE or the UE is not configured to apply SENSE.

The operation flow/algorithmic structure 400 may further include, at 408, obtaining a second value that indicates a threshold to be used for PLMN selection. The threshold may be an operator-controlled signal threshold for RSRP/RSRQ for PLMN selection. In some embodiments, a plurality of threshold values may be obtained at 408. For example, a first threshold value may correspond to an RSRP for PLMN selection and a second threshold value may correspond to an RSRQ for PLMN selection.

The operation flow/algorithmic structure 400 may further include, at 412, transmitting an AT command with the first/second values. In some embodiments, the TE may reference the first value to determine whether SENSE is to be applied and provide the AT command with the second value if SENSE is to be applied. In these embodiments, the AT command may or may not include the first value. In other embodiments, both the first and second values may be provided in the AT command.

The AT command may be a PLMN selection (+COPS) AT command, a preferred PLMN list (+CPOL) AT command, a selection of preferred PLMN list (+CPLS) AT command, or a PLMN selection with operator thresholds (+COPTHRESH) AT command.

Figure 5:
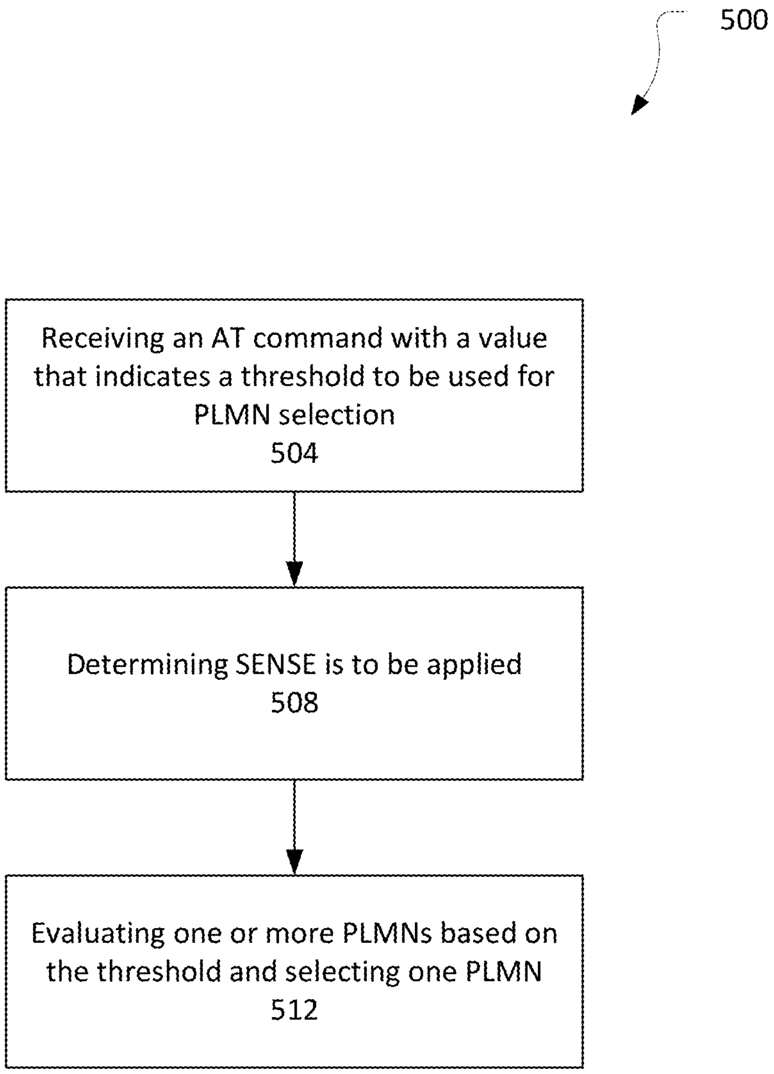
FIG. 5 another operational flow/algorithmic structure in accordance with some embodiments.

FIG. 5 is an operation flow/algorithmic structure 500 in accordance with some embodiments. The operation flow/algorithmic structure 500 may be implemented by an MT (for example, MT 208) of a UE such as, for example, UE 104 or 700 or components therein, for example, processors 704.

The operation flow/algorithmic structure 500 may include, at 504, receiving an AT command with a value that indicates a threshold to be used for PLMN selection. The threshold may be an RSRP or an RSRQ threshold. In some embodiments, the AT command may include an RSRP threshold value and an RSRQ threshold value.

The operation flow/algorithmic structure 500 may further include, at 508, determining that SENSE is to be applied. In some embodiments, the determination that SENSE is to be applied is based on receipt of the RSRP/RSRQ threshold in the AT command. In other embodiments, the determination that SENSE is to be applied is based on detection of an apply-threshold value that is either provided in the AT command or otherwise obtained.

The operation flow/algorithmic structure 500 may further include, at 512, evaluating one or more PLMNs based on the threshold and selecting one PLMN. The PLMN evaluation may be conducted in the order provided in 3GPP TS 23.122 with additional consideration of the threshold. For example, the MT may first determine whether a PLMN associated with a highest priority level (e.g., an HPLMN or EHPLMN) is available and meets the threshold. If so, that PLMN may be selected for association. If not, the MT may then determine whether a PLMN associated with the second highest priority level (e.g., a PLMN listed in a user-controlled PLMN selector with access technology data file in a SIM) is available and meets the threshold. If so, that PLMN may be selected for association. If not, the MT may then determine whether a PLMN associated with the third highest priority level (e.g., a PLMN listed in an operator-controlled PLMN selector with access technology data file in a SIM or memory of the UE) is available and meets the threshold. If so, that PLMN may be selected for association. If not, the MT may then determine whether a PLMN associated with the fourth highest priority level (e.g., other PLMN with received high-quality signal in random order) is available. Consideration of the threshold may not be necessary with this step given the consideration of the high-quality threshold. If such a PLMN is available, that PLMN may be selected for association. If not, the MT may then determine whether a PLMN associated with the fifth highest priority level (e.g., other PLMN in order of decreasing signal quality) is available and meets the threshold. If so, that PLMN may be selected for association. If not, the MT may then repeat the evaluation of priority levels one, two, three, and five (in order) without application of the threshold. In the event that no PLMN is still available, the MT may then select a PLMN associated with the sixth or seventh highest priority levels if available.

Figure 6:
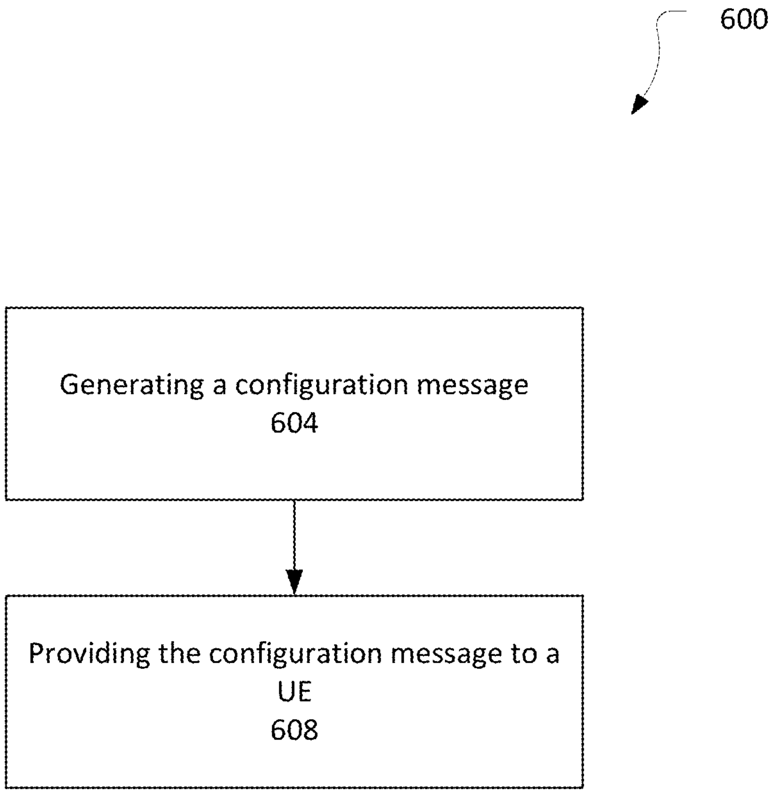
FIG. 6 illustrates another operational flow/algorithmic structure in accordance with some embodiments.

FIG. 6 is an operation flow/algorithmic structure 600 in accordance with some embodiments. The operation flow/algorithmic structure 600 may be implemented by a network node, for example, a node of PLMN A 108 or PLMN B 112 or network node 800 or components therein, for example, processors 804.

The operation flow/algorithmic structure 600 may include, at 604, generating a configuration message. The configuration message may include information to configure a NAS configuration MO at the UE with a SENSE configuration leaf to indicate whether the UE is configured to apply SENSE. In some embodiments, the SENSE configuration leaf may include a zero value to indicate that the UE is not configured to apply SENSE or a one value to indicate that the UE is configured to apply SENSE.

In some embodiments, the network node may determine a UE characteristic and set the SENSE configuration leaf based on the UE characteristic. The UE characteristic may be associated with a subscription of the UE, a type of the UE (e.g., whether the UE is an IoT device), or a mobility pattern of the UE (e.g., whether the UE is a stationary UE).

The operation flow/algorithmic structure 600 may further include, at 608, providing the configuration message to the UE.

Figure 7:
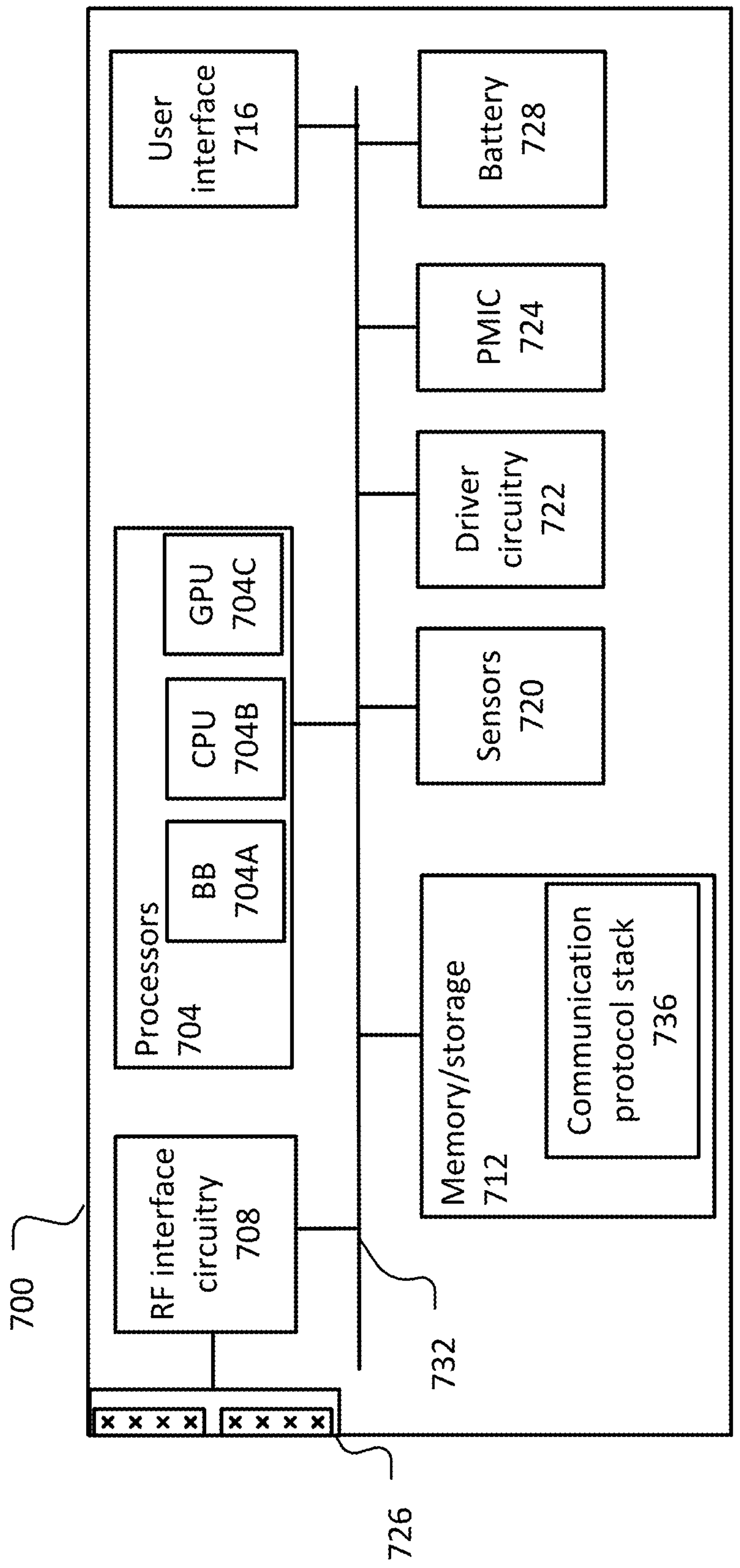
FIG. 7 illustrates an user equipment in accordance with some embodiments.

FIG. 7 illustrates a UE 700 in accordance with some embodiments. The UE 700 may be similar to and substantially interchangeable with UE 104 of FIG. 1.

The UE 700 may be any mobile or non-mobile computing device, such as, for example, a mobile phone, computer, tablet, XR device, glasses, industrial wireless sensor (for example, microphone, carbon dioxide sensor, pressure sensor, humidity sensor, thermometer, motion sensor, accelerometer, laser scanner, fluid level sensor, inventory sensor, electric voltage/current meter, or actuator), video surveillance/monitoring device (for example, camera or video camera), wearable device (for example, a smart watch), or Internet-of-things device.

The UE 700 may include processors 704, RF interface circuitry 708, memory/storage 712, user interface 716, sensors 720, driver circuitry 722, power management integrated circuit (PMIC) 724, antenna structure 726, and battery 728. The components of the UE 700 may be implemented as integrated circuits (ICs), portions thereof, discrete electronic devices, or other modules, logic, hardware, software, firmware, or a combination thereof. The block diagram of FIG. 7 is intended to show a high-level view of some of the components of the UE 700. However, some of the components shown may be omitted, additional components may be present, and different arrangement of the components shown may occur in other implementations.

The components of the UE 700 may be coupled with various other components over one or more interconnects 732, which may represent any type of interface, input/output, bus (local, system, or expansion), transmission line, trace, or optical connection that allows various circuit components (on common or different chips or chipsets) to interact with one another.

The processors 704 may include processor circuitry such as, for example, baseband processor circuitry (BB) 704A, central processor unit circuitry (CPU) 704B, and graphics processor unit circuitry (GPU) 704C. The processors 704 may include any type of circuitry or processor circuitry that executes or otherwise operates computer-executable instructions, such as program code, software modules, or functional processes from memory/storage 712 to cause the UE 700 to perform operations as described herein.

In some embodiments, the baseband processor circuitry 704A may access a communication protocol stack 736 in the memory/storage 712 to communicate over a 3GPP compatible network. In general, the baseband processor circuitry 704A may access the communication protocol stack 736 to: perform user plane functions at a PHY layer, MAC layer, RLC sublayer, PDCP sublayer, SDAP sublayer, and upper layer; and perform control plane functions at a PHY layer, MAC layer, RLC sublayer, PDCP sublayer, RRC layer, and a NAS layer. In some embodiments, the PHY layer operations may additionally/alternatively be performed by the components of the RF interface circuitry 708.

The baseband processor circuitry 704A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 712 may include one or more non-transitory, computer-readable media that includes instructions (for example, communication protocol stack 736) that may be executed by one or more of the processors 704 to cause the UE 700 to perform various operations described herein. The memory/storage 712 include any type of volatile or non-volatile memory that may be distributed throughout the UE 700. In some embodiments, some of the memory/storage 712 may be located on the processors 704 themselves (for example, L1 and L2 cache), while other memory/storage 712 is external to the processors 704 but accessible thereto via a memory interface. The memory/storage 712 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology. The memory/storage 712 may include a SIM/USIM in some embodiments.

In some embodiments, the UE 700 may include a UICC that is removably coupled with platform circuitry of the UE 700 through, for example, a card slot. The UICC may include portions of the processors 704 and memory/storage 712. The memory/storage may include a SIM/USIM having SENSE values stored thereon. In other embodiments, the components of the UICC may be integrated directly into (e.g., permanently coupled with) the platform circuitry of the UE 700.

The RF interface circuitry 708 may include transceiver circuitry and radio frequency front module (RFEM) that allows the UE 700 to communicate with other devices over a radio access network. The RF interface circuitry 708 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 726 and proceed to filter and amplify (with a low-noise amplifier) the signal. The signal may be provided to a receiver of the transceiver that down-converts the RF signal into a baseband signal that is provided to the baseband processor of the processors 704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna structure 726.

In various embodiments, the RF interface circuitry 708 may be configured to transmit/receive signals in a manner compatible with NR access technologies.

The antenna structure 726 may include antenna elements to convert electrical signals into radio waves to travel through the air and to convert received radio waves into electrical signals. The antenna elements may be arranged into one or more antenna panels. The antenna structure 726 may have antenna panels that are omnidirectional, directional, or a combination thereof to enable beamforming and multiple input, multiple output communications. The antenna structure 726 may include microstrip antennas, printed antennas fabricated on the surface of one or more printed circuit boards, patch antennas, or phased array antennas. The antenna structure 726 may have one or more panels designed for specific frequency bands including bands in FR1 or FR2.

The user interface 716 includes various input/output (I/O) devices designed to enable user interaction with the UE 700. The user interface 716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 700.

The sensors 720 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 722 may include software and hardware elements that operate to control particular devices that are embedded in the UE 700, attached to the UE 700, or otherwise communicatively coupled with the UE 700. The driver circuitry 722 may include individual drivers allowing other components to interact with or control various I/O devices that may be present within, or connected to, the UE 700. For example, the driver circuitry 722 may include circuitry to facilitate coupling of a UICC (for example, UICC 78) to the UE 700. For additional examples, driver circuitry 722 may include a display driver to control and allow access to a display device, a touchscreen driver to control and allow access to a touchscreen interface, sensor drivers to obtain sensor readings of sensors 720 and control and allow access to sensors 720, drivers to obtain actuator positions of electro-mechanic components or control and allow access to the electro-mechanic components, a camera driver to control and allow access to an embedded image capture device, audio drivers to control and allow access to one or more audio devices.

The PMIC 724 may manage power provided to various components of the UE 700. In particular, with respect to the processors 704, the PMIC 724 may control power-source selection, voltage scaling, battery charging, or DC-to-DC conversion.

In some embodiments, the PMIC 724 may control, or otherwise be part of, various power saving mechanisms of the UE 700 including DRX as discussed herein.

A battery 728 may power the UE 700, although in some examples the UE 700 may be mounted deployed in a fixed location, and may have a power supply coupled to an electrical grid. The battery 728 may be a lithium ion battery, a metal-air battery, such as a zinc-air battery, an aluminum-air battery, a lithium-air battery, and the like. In some implementations, such as in vehicle-based applications, the battery 728 may be a typical lead-acid automotive battery.

Figure 8:
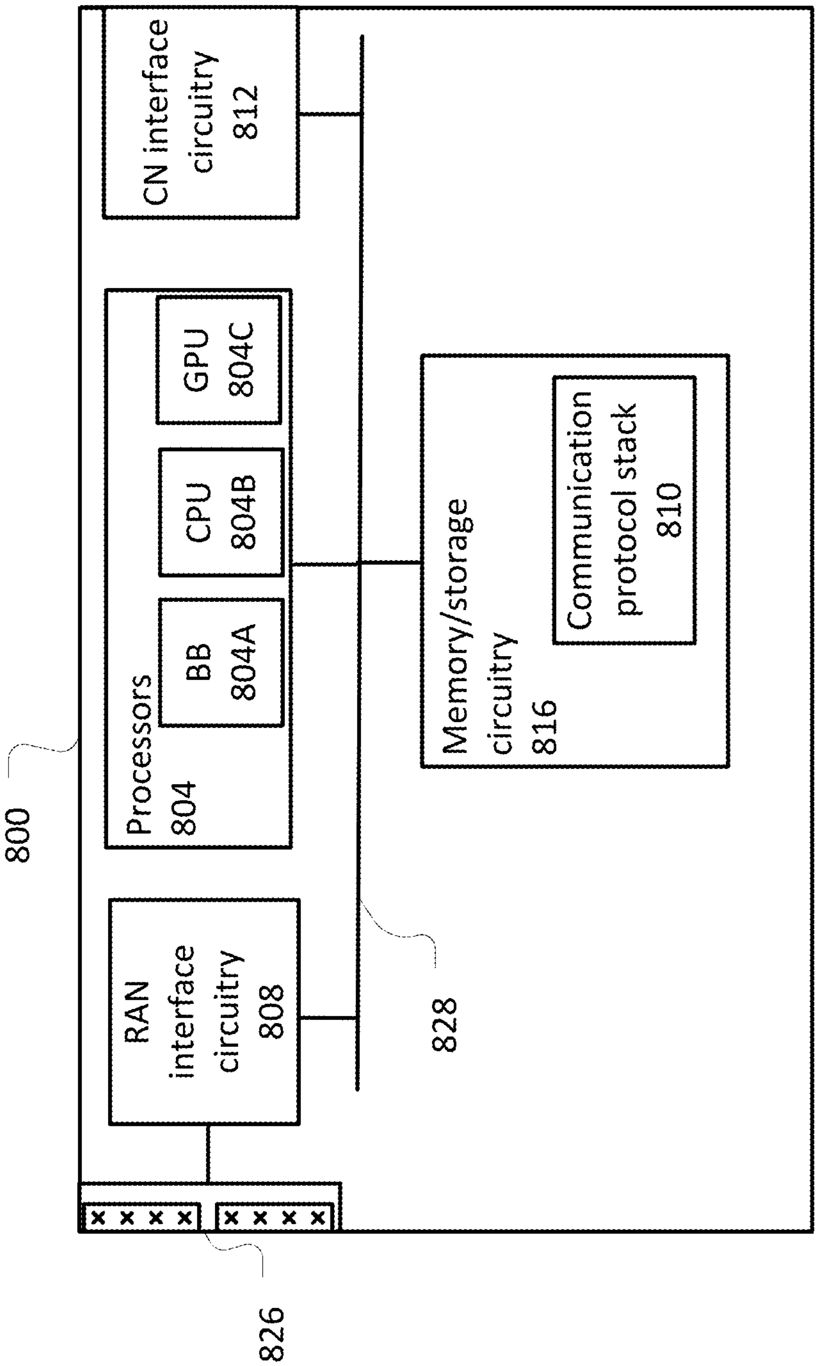
FIG. 8 illustrates a network node in accordance with some embodiments.

FIG. 8 illustrates a network node 800 in accordance with some embodiments. The network node 800 may be similar to and substantially interchangeable with base station 108, a device implementing one of the network hops 84, an IAB node, a network-controlled repeater, or a server in a core network or external data network.

The network node 800 may include processors 804, RF interface circuitry 808 (if implemented as an access node), core network (CN) interface circuitry 812, memory/storage circuitry 816, and antenna structure 826.

The components of the network node 800 may be coupled with various other components over one or more interconnects 828.

The processors 804, RF interface circuitry 808, memory/storage circuitry 816 (including communication protocol stack 810), antenna structure 826, and interconnects 828 may be similar to like-named elements shown and described with respect to FIG. 7.

The CN interface circuitry 812 may provide connectivity to a core network, for example, a 5th Generation Core network (5GC) using a 5GC-compatible network interface protocol such as carrier Ethernet protocols, or some other suitable protocol. Network connectivity may be provided to/from the network node 800 via a fiber optic or wireless backhaul. The CN interface circuitry 812 may include one or more dedicated processors or FPGAs to communicate using one or more of the aforementioned protocols. In some implementations, the CN interface circuitry 812 may include multiple controllers to provide connectivity to other networks using the same or different protocols.

In some embodiments, the network node 800 may be coupled with transmit receive points (TRPs) using the antenna structure 826, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method comprising: obtaining a first value to indicate whether signal level enhanced network selection (SENSE) is to be applied; obtaining a second value that indicates a threshold to be used for public land mobile network (PLMN) selection; and transmitting an attention (AT) command with an indication of the second value.

Example 2 includes the method of example 1 or some other example herein of claim 1, wherein obtaining the second value comprises: obtaining the second value from non-volatile memory of a user equipment (UE) or a universal subscriber identity module (USIM).

Example 3 includes the method of example 2 or some other example herein, wherein obtaining the first value comprises obtaining the second value from a USIM and the method further comprises: obtaining a third value from a non-volatile memory of a UE; and selecting the second value for the threshold to be used for the PLMN selection based on obtaining the second value from the USIM and the third value from the non-volatile memory.

Example 4 includes a method of example 1 or some other example herein, wherein obtaining the first value further comprises: obtaining the first value from a non-access stratum (NAS) configuration management object (MO).

Example 5 includes a method of example 1 or some other example herein, wherein the threshold is a signal threshold for reference signal received power or reference signal received quality.

Example 6 includes a method of example 1 or some other example herein, further comprising: obtaining a first set of SENSE values, including the first value and the second value, associated with a first access technology; and obtaining a second set of SENSE values associated with a second access technology.

Example 7 includes the method of example 1 or some other example herein, wherein the AT command further includes an indication of the first value.

Example 8 includes the method of any one of examples 1-7 or some other example herein, wherein the AT command is a public land mobile network (PLMN) selection AT command, a preferred PLMN list AT command, or a selection of preferred PLMN list AT command.

Example 9 includes the method of any one of examples 1-7, wherein the AT command is a PLMN selection with operator threshold AT command.

Example 10 includes a method comprising: receiving an attention (AT) command with a value that indicates a threshold to be used for public land mobile network (PLMN) selection; determining signal level enhanced network selection (SENSE) is to be applied; evaluating, based on said determining, one or more PLMNs based on the threshold; and selecting a PLMN from the one or more PLMNs based on said evaluating.

Example 11 includes the method of example 10 or some other example herein, wherein the value is a first value and the AT command further includes a second value to indicate that SENSE is to be applied.

Example 12 includes the method of example 10 or some other example herein, wherein the threshold is a signal threshold for reference signal received power or reference signal received quality.

Example 13 includes the method of example 10 or some other example herein, wherein the AT command includes one or more first SENSE values, including the value, associated with a first access technology, and one or more second SENSE values associated with a second access technology.

Example 14 includes the method of any one of examples 10-13 or some other example herein, wherein the AT command is a PLMN selection AT command, a preferred PLMN list AT command, or a selection of preferred PLMN list AT command.

Example 15 includes the method of any one of examples 10-13, wherein the AT command is a PLMN selection with operator threshold command.

Example 16 includes a method of example 10 or some other example herein, further comprising: receiving a read command; and transmitting a response based on the read command, the response to include the value.

Example 17 includes a method of example 10 or some other example herein, further comprising: receiving a test command; and transmitting a response based on the test command, the response to include a list of supported values, wherein the list of supported values includes the value.

Example 18 includes a method of operating a network device, the method comprising: generating a configuration message; and providing, to a user equipment (UE), the configuration message to configure a non-access stratum (NAS) configuration management object (MO) with a signal level enhanced network selection (SENSE) configuration leaf to indicate whether the UE is configured to apply SENSE.

Example 19 includes the method of example 18 or some other example herein, further comprising: determining a UE characteristic associated with a subscription of the UE, a type of the UE, or a mobility pattern of the UE; and providing the configuration message to configure the NAS MO with the SENSE configuration leaf based on the UE characteristic.

Example 20 includes the method of example 18 or some other example herein, wherein the SENSE configuration leaf includes a zero value to indicate that the UE is not configured to apply SENSE or a one value to indicate that the UE is configured to apply SENSE.

Example 21 includes a method of example 18 or some other example herein, further comprising: providing, to the UE, a threshold to be used for public land mobile network (PLMN) selection.

Example 22 includes the method of example 21 or some other example herein, further comprising: providing the threshold to the UE using a steering of roaming mechanism.

Example 23 includes a method comprising: receiving, at a mobile termination, an attention (AT) command from a terminal equipment; and transmitting a response to the terminal equipment based on the AT command, wherein the response includes a configured threshold to be used for public land mobile network (PLMN) selection or a list of supported thresholds to be used for PLMN selection.

Example 24 includes the method of example 23 or some other example herein, wherein the AT command is a read command or a test command.

Example 25 includes a method of example 23 or 24 or some other example herein, wherein the AT command is a PLMN selection AT command, a preferred PLMN list AT command, a selection of preferred PLMN list AT command, or a PLMN selection with operator thresholds AT command.

Another example may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Another example may include an apparatus comprising logic, modules, or circuitry to perform one or more elements of a method described in or related to any of examples 1-25, or any other method or process described herein.

Another example may include a method, technique, or process as described in or related to any of examples 1-25, or portions or parts thereof.

Another example may include an apparatus comprising: one or more processors and one or more computer-readable media comprising instructions that, when executed by the one or more processors, cause the one or more processors to perform the method, techniques, or process as described in or related to any of examples 1-25, or portions thereof.

Another example include a signal as described in or related to any of examples 1-25, or portions or parts thereof.

Another example may include a datagram, information element, packet, frame, segment, PDU, or message as described in or related to any of examples 1-25, or portions or parts thereof, or otherwise described in the present disclosure.

Another example may include a signal encoded with data as described in or related to any of examples 1-25, or portions or parts thereof, or otherwise described in the present disclosure.

Another example may include a signal encoded with a datagram, TE, packet, frame, segment, PDU, or message as described in or related to any of examples 1-25, or portions or parts thereof, or otherwise described in the present disclosure.

Another example may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Another example may include a computer program comprising instructions, wherein execution of the program by a processing element is to cause the processing element to carry out the method, techniques, or process as described in or related to any of examples 1-25, or portions thereof.

Another example may include a signal in a wireless network as shown and described herein.

Another example may include a method of communicating in a wireless network as shown and described herein.

Another example may include a system for providing wireless communication as shown and described herein.

Another example may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

obtaining, from a signal level enhanced network selection (SENSE) configuration leaf of a non-access stratum (NAS) configuration management object (MO), a first value, wherein the first value is a one to indicate that a user equipment (UE) is to apply SENSE;

obtaining a second value that indicates a threshold to be used for public land mobile network (PLMN) selection; and performing a SENSE operation based on the first and second values.

2. The method of claim 1, further comprising:

generating an attention (AT) command with an indication of the second value.

3. The method of claim 2, wherein the AT command is a public land mobile network (PLMN) selection AT command, a preferred PLMN list AT command, or a selection of preferred PLMN list AT command.

4. The method of claim 1, further comprising:

generating an attention (AT) command to request an operator-controlled signal threshold and an associated access technology.

5. The method of claim 1, wherein obtaining the second value comprises: obtaining the second value from non-volatile memory of a user equipment (UE) or a universal subscriber identity module (USIM).

6. The method of claim 5, wherein obtaining the second value comprises obtaining the second value from a USIM and the method further comprises:

obtaining a third value from a non-volatile memory of a UE; and selecting the second value for the threshold to be used for the PLMN selection based on the second value being obtained from the USIM and the third value being obtained from the non-volatile memory.

7. The method of claim 1, wherein the threshold is a signal threshold for reference signal received power or reference signal received quality.

8. The method of claim 1, further comprising:

obtaining a first set of SENSE values, including the first value and the second value, associated with a first access technology; and obtaining a second set of SENSE values associated with a second access technology.

9. An apparatus to be implemented in a user equipment (UE), the apparatus comprising:

interface circuitry; and processing circuitry, coupled with the interface circuitry, the processing circuitry to:

determine signal level enhanced network selection (SENSE) is to be applied based on a SENSE configuration leaf of a non-access stratum (NAS) configuration management object (MO), the SENSE configuration leaf having a value of one to indicate that the UE is to apply SENSE;

evaluate, based on said determination that SENSE is to be applied, one or more public land mobile networks (PLMNs) based on a threshold to be used for PLMN selection; and select a PLMN from the one or more PLMNs based on evaluation of the one or more PLMNs based on the threshold.

10. The apparatus of claim 9, wherein the threshold is a signal threshold for reference signal received power or reference signal received quality.

11. The apparatus of claim 9, wherein the processing circuitry is to further:

receive, via the interface circuitry, an attention (AT) command with a value that indicates the threshold.

12. The apparatus of claim 11, wherein the AT command includes one or more first SENSE values, including the value, associated with a first access technology, and one or more second SENSE values associated with a second access technology.

13. The apparatus of claim 9, wherein the processing circuitry is further to:

receive a read command; and transmit a response based on the read command, the response to include a value that indicates the threshold.

14. The apparatus of claim 13, wherein the read command is a PLMN selection with operator threshold command.

15. The apparatus of claim 9, wherein the processing circuitry is further to:

receive a test command; and transmit a response based on the test command, the response to include a list of supported values, wherein the list of supported values includes a value that indicates the threshold.

16. A method of operating a network device, the method comprising:

generating a configuration message; and transmitting the configuration message to a user equipment (UE) to configure a non-access stratum (NAS) configuration management object (MO) with a signal level enhanced network selection (SENSE) configuration leaf to indicate whether the UE is configured to apply SENSE, wherein the SENSE configuration leaf includes a zero value to indicate that the UE is not configured to apply SENSE or a one value to indicate that the UE is configured to apply SENSE.

17. The method of claim 16, further comprising:

determining a UE characteristic associated with a subscription of the UE, a type of the UE, or a mobility pattern of the UE; and transmitting the configuration message to configure the NAS MO with the SENSE configuration leaf based on the UE characteristic.

18. The method of claim 16, further comprising:

providing, to the UE, a threshold to be used for public land mobile network (PLMN) selection.

19. The method of claim 18, further comprising:

providing the threshold to the UE using a steering of roaming mechanism.

* * * * *